United States Patent [19]

Szupkay

[11] Patent Number: 5,794,434
[45] Date of Patent: Aug. 18, 1998

[54] AIRCRAFT THRUST REVERSER SYSTEM WITH LINEARLY TRANSLATING INNER AND OUTER DOORS

[75] Inventor: Imre A. Szupkay, Othello, Wash.

[73] Assignee: The Boeing Company, Seattle, Wash.

[21] Appl. No.: 727,952

[22] Filed: Oct. 9, 1996

[51] Int. Cl.⁶ .................................................. F02K 3/02
[52] U.S. Cl. .......................... 60/226.2; 60/230; 60/271; 244/110 B; 239/265.29
[58] Field of Search ............................ 60/226.2, 230, 60/232, 271; 244/110 B; 239/265.19, 265.27, 265.29, 265.31

[56] References Cited

U.S. PATENT DOCUMENTS

| | | |
|---|---|---|
| 2,997,845 | 8/1961 | Oulianoff . |
| 3,263,931 | 8/1966 | Bartek et al. . |
| 3,409,228 | 11/1968 | Mehr . |
| 3,524,588 | 8/1970 | Duval . |
| 3,550,721 | 12/1970 | Bruner . |
| 3,599,432 | 8/1971 | Ellis ............................. 60/226.1 |
| 3,613,826 | 10/1971 | Cabassut . |
| 3,637,041 | 1/1972 | Hilbig . |
| 3,647,020 | 3/1972 | MacDonald . |
| 3,664,455 | 5/1972 | Duvvuri . |
| 3,695,387 | 10/1972 | Hilbig . |
| 3,774,868 | 11/1973 | Goetz . |
| 3,779,010 | 12/1973 | Chamay ........................ 60/226.2 |
| 3,829,020 | 8/1974 | Stearns ......................... 60/226.2 |
| 3,897,169 | 7/1975 | Fowler . |
| 4,030,291 | 6/1977 | Sargisson ..................... 60/226.2 |
| 4,095,417 | 6/1978 | Banthin . |
| 4,147,028 | 4/1979 | Rodgers ........................ 60/226.2 |
| 4,165,609 | 8/1979 | Rudolph . |
| 4,175,640 | 11/1979 | Birch et al. . |
| 4,215,536 | 8/1980 | Rudolph . |
| 4,232,516 | 11/1980 | Lewis et al. .................. 60/226.2 |
| 4,278,220 | 7/1981 | Johnston et al. ............. 244/110 B |
| 4,422,524 | 12/1983 | Osborn . |
| 4,537,026 | 8/1985 | Nightingale . |
| 4,690,329 | 9/1987 | Madden . |
| 4,819,876 | 4/1989 | Thayer . |
| 5,044,559 | 9/1991 | Russell et al. . |
| 5,120,004 | 6/1992 | Matthias ...................... 60/226.2 |
| 5,154,052 | 10/1992 | Giffin et al. . |
| 5,291,672 | 3/1994 | Brown . |

FOREIGN PATENT DOCUMENTS 1116190  6/1988  United Kingdom ............. 60/226.2

OTHER PUBLICATIONS

"The Jet Engine," chapters 6, 14, 15 and 19, Rolls-Royce plc, 1992.

*Primary Examiner*—Timothy Thorpe
*Assistant Examiner*—Ted Kim
*Attorney, Agent, or Firm*—Christensen O'Connor Johnson & Kindness PLLC

[57] ABSTRACT

A thrust reverser system including a reverse thrust airflow duct (44) extending through an outer structure (46) of an aircraft engine aft nozzle (32) is disclosed. The reverse thrust duct (44) connects a nozzle exhaust duct (34) with the surrounding atmosphere (46). The duct (44) includes an inlet (72) and an outlet (70). A plurality of slats (50) are located within the reverse thrust duct to direct nozzle exhaust (38) from the nozzle exhaust duct (34) in an outward and/or forward direction. One or more outer doors (54) are formed near the outer structure exterior surface (90) for closing off the reverse thrust duct outlet (70) to the atmosphere. One or more inner doors (56) are provided for closing off the duct inlet (72) at the exhaust duct (34). An actuation system moves the inner and outer doors (56), (54) between open and closed positions. In the open position, the inner and outer doors (56), (54) are moved away from the duct (44) to open the airflow duct inlet and outlet. A portion (98) of the inner door blocks off the nozzle exhaust duct (34) by moving aftward to contact a nozzle centerbody (36). The exhaust air (38) is forced to exit the nozzle (32) via the duct (44) causing reverse thrust.

17 Claims, 9 Drawing Sheets

AIRCRAFT THRUST REVERSER SYSTEM WITH LINEARLY TRANSLATING INNER AND OUTER DOORS

FIELD OF THE INVENTION

The present invention relates to aircraft engine thrust reverser systems, and more particularly, to thrust reverser systems for use with aft engine nozzles having a centerbody structure.

BACKGROUND OF THE INVENTION

Referring to FIGS. 1 and 2, conventional cascade thrust reverser systems 10 for use with turbojet engines generally include a series of circumferential blocker doors 12 that rotate into and out of an annular bypass airflow duct 14 existing between a fan outer structure 16 and a gas generator casing 18. As shown in FIG. 2, upon encountering the blocker doors 12, bypass air 20 is diverted through a series of cascades 22 located in an outer structure passage 24. For axisymmetric nozzles, the cascades 22 typically have an arcuate shape and are supported between longitudinal engine support struts (similar support members 60 are shown in FIG. 6). The cascades 22 form a band of vents in the outer structure passage 24 that guide bypass air 20 radially outward and forward. The exiting gases 20 are therefore exhausted with a forward directional component that has an equal and opposite effect on the engine and aircraft, thus causing a reverse thrust force on the aircraft. Cascade thrust reverser systems 10 work well with engines that have relatively large bypass airflow ducts 14. Ample space is usually available to house the blocker doors 12 and the various components required to move the blocker doors 12 into and out of the airflow duct 14.

For some jet engines, particularly those without bypass ducting, it is necessary to reverse the flow of engine exhaust or a mixed flow (e.g., a combination of bypass and engine airflows) in an aft nozzle. In some aft nozzles, conventional cascade thrust reverser systems 10, modified to accommodate the higher temperatures and smaller space, can be used. In contrast, other aft nozzles having a tail cone, centerbody, plug assembly, etc. are often too confined to use a cascade thrust reverser system. Even where a cascade thrust reverser system could fit, it is often at the expense of having to design and maintain a more complicated actuation system. As a result, in the past, other types of thrust reverser systems have been used, e.g., a clamshell arrangement or a target-type system. Such thrust reverser systems cantilever heavy mechanisms from the aft end of the nozzle. This disadvantageously increases the loads in the engine case and nacelle, which in turn, increases the required load-carrying capability of the support structures. These structures can ultimately become quite large, especially in applications having large nozzles and fan ducts.

Thus, a need exists for a smaller and less complicated thrust reverser system for diverting exhaust gases from an aircraft jet engine, particularly, a jet engine having an aft engine nozzle within which either engine exhaust or mixed flow exhaust exit the engine. The present invention is directed to fulfilling this need.

SUMMARY OF THE INVENTION

In accordance with the present invention a thrust reverser system suitable for use with a turbojet or turbofan aircraft engine nozzle having an outer structure that surrounds an exhaust duct and a centerbody or plug that extends longitudinally within the duct is provided. Thrust reverser systems formed in accordance with the present invention are particularly useful for engine exhaust nozzles having a translating centerbody or plug assembly with a high aspect ratio.

In accordance with aspects of this invention, the thrust reverser system includes a reverse thrust airflow duct extending through an outer structure or cowling of an aircraft nozzle. The duct connects the exhaust path with the ambient area surrounding the nozzle. The reverse thrust airflow duct includes an inlet located near the nozzle exhaust duct and an outlet located near the outer structure exterior. Optimally, the duct width is sized smaller than the exhaust duct width in order for the reverse thrust airflow duct to form a slight throat. A plurality of slats are located within the reverse thrust duct to direct nozzle exhaust in an outward and/or forward direction. Preferably, the slats are formed of heat and corrosion resistant materials.

An outer door is provided near the outer structure exterior surface to cover the reverse thrust duct outlet when the thrust reverser system is not in use. To improve aerodynamic flow over the nozzle during forward thrust, the outer door exterior surface is positioned flush with the surrounding outer structure exterior surfaces when the door is closed. During reverse thrust, the duct outlet is opened by translation of the outer door slightly outward and then aft. An inner door is provided near the exhaust duct walls for closing off the duct inlet when the thrust reverser system is not in use.

In one embodiment of the invention, the inner door includes at least two portions. A first portion covers the inlet when the inner door is closed. A second portion extends aft of the first portion and forms a contoured portion of the exhaust duct interior wall. The second portion contacts the centerbody when the inner door is opened, thus blocking the exhaust duct. This forces the exhaust to exit the nozzle via the reverse thrust airflow duct. In another embodiment, the portion of the inner door covering the inlet during a closed state is the same portion used to contact the centerbody during an open state.

An actuation system moves the inner and outer doors between their open and closed positions. In one embodiment of the invention, the actuation system includes inner and outer ball-screw assemblies. Each ball-screw assembly includes a longitudinally-oriented threaded rod to which at least one carriage is threaded. Each carriage is connected to its respective door. A rotation mechanism causes rotational motion of the threaded rod that results in translation of the doors. Known rotation mechanisms may be used, e.g., hydraulic linear or rotary actuators, electric motors, etc. Preferably, the inner and outer ball-screw assemblies are actuated in unison by a control system. Other actuation techniques may be employed. One alternative actuation assembly includes a single linear actuator capable of simultaneously translating both the inner and outer doors through the use of an interconnecting member.

During forward thrust, the doors are closed. This prohibits exhaust from exiting the nozzle via the duct since both the duct inlet and outlet are covered. During reverse thrust, the inner and outer doors are opened, exposing the duct inlet and outlet. A portion of the inner door blocks off the exhaust duct by moving aftward to contact a nozzle centerbody. The engine exhaust is thereby forced to exit the aft nozzle via the reverse thrust airflow duct.

In accordance with further aspects of the invention, the system may be configured for use on either an axisymmetric nozzle or a two-dimensional nozzle. In an axisymmetric application, a preferred number of about 8 to 16 outer doors are spaced evenly about the nozzle circumference. The inner door is preferably a unitary cylindrical annulus, though, a multi-piece annulus may suffice. In a two-dimensional nozzle, the outer door is formed by a combination of both upper and lower outer doors. The inner door is also a combination of upper and lower doors.

As will be further appreciated by a reading of the following detailed description, a thrust reverser system formed in accordance with the present invention does not require a large amount of space and is relatively uncomplicated, making it easy to design and maintain. The system can be used in engine nozzles to direct either engine exhaust or a mixed flow exhaust.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
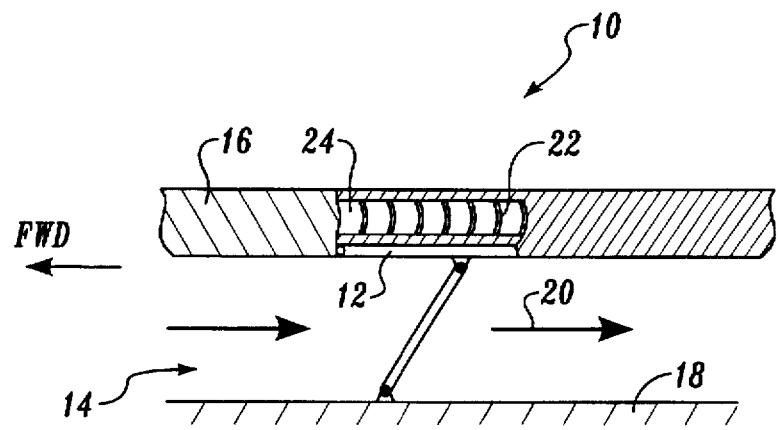
FIG. 1 is a side cross-sectional view illustrating a prior art cascade thrust reverser system in a closed state.

The embodiments of the thrust reverser system illustrated in herein are shown as applied to a turbofan or turbojet engine having an aft nozzle 32 connected to a gas generator. The nozzle 32 has an exhaust duct 34 with a circular cross-sectional shape at the region where the thrust reverser system is located. The nozzle includes a raised centerbody 36 or the like that extends longitudinally aft, along the nozzle centerline. The nozzle 32 and the thrust reverser system direct engine exhaust gases 38 from the engine in a manner that optimizes the aerodynamic and thrust performance of the engine.

It should be noted that the above limitations are provided for illustrative purposes only. With suitable changes, the present invention may be practiced in other types of nozzles or engine ducts having a raised center structure and requiring the reversion of any gas flow, e.g., bypass airflow or a mixed flow. Likewise, even though the description below focuses on circular or axisymmetric aft engine nozzles, the present invention thrust reverser system may be easily adapted for use in a two-dimensional, or rectangular cross-sectioned nozzle.

In general, the thrust reverser system illustrated in FIGS. 3–11 includes a reverse thrust airflow duct 44 extending through an outer structure 46 of the aft nozzle 32. The reverse thrust duct 44 connects the nozzle exhaust duct 34 with the surrounding ambient atmosphere (ambient airflow is indicated by the arrow labeled 48). Cascades, such as a plurality of slats or louvers 50, are located within the reverse thrust duct 44 to direct exhaust airflow 38 from the exhaust duct 34 in an outward direction. The slats also define the characteristics of the throat of the reverse thrust airflow duct, e.g., size, location, etc. Formed at the outer structure exterior surface 90 are one or more outer doors 54 for closing off the reverse thrust duct 44 to the ambient atmosphere. One or more inner doors 56 are provided for closing off the duct 44 at the exhaust duct 34. An actuation system moves the outer and inner doors 54, 56 between open and closed positions. To reach its open position, the doors 54, 56 are translated aft, opening the airflow duct 44 of the thrust reverser. A portion of the inner door 56 blocks off the exhaust duct 34 by closely contacting the nozzle centerbody 36. The engine exhaust 38 is thereby forced to exit the aft nozzle 32 via the reverse thrust airflow duct 44.

As is known in the art of nozzle design, the outer structure 46 includes numerous support beams and struts 60, only some of which are shown in FIGS. 3–7 for ease and clarity of illustration. The support beams and struts are positioned longitudinally and circumferentially (or laterally) throughout the nozzle 32. The support beams and struts 60 are provided to support the weight of the various nozzle components and to react nozzle pressure and maneuver loads during flight. The present invention uses such support beams and struts to carry the thrust reverser system components as well. While not shown, it is to be understood that these elements are provided and located at appropriate positions. Outer and inner skins 62 that form the outer nozzle surface and inner duct surfaces, respectively, are attached to the support beams and struts. The support beams and struts 60 and the skins 62 are modified to accommodate the present invention thrust reverser system as described below.

Engine aft nozzles use centerbodies to alter the nozzle duct contour in order to influence engine thrust and performance characteristics. Referring to FIGS. 3–4 and 10–11, the centerbody 36 includes a rise in the form of an outwardly extending portion or hump 64. The hump 64 provides a contact point for the aft-translating inner door 56. As may therefore be appreciated, the present invention works best with nozzles or fan ducts that have high aspect ratio centerbodies or pronounced humps. The centerbody 36 may be an exhaust tail cone, plug assembly, or other component positioned longitudinally in the nozzle duct 34. The centerbody 36 is located along the nozzle centerline and terminates at an aft region of the nozzle duct. The centerbody 36 may be stationary or movable, but in all circumstances should be capable of obtaining a position as required by the present invention thrust reverser system. This required position is discussed below with regard to the configuration of the thrust reverser system during use.

Figure 4:
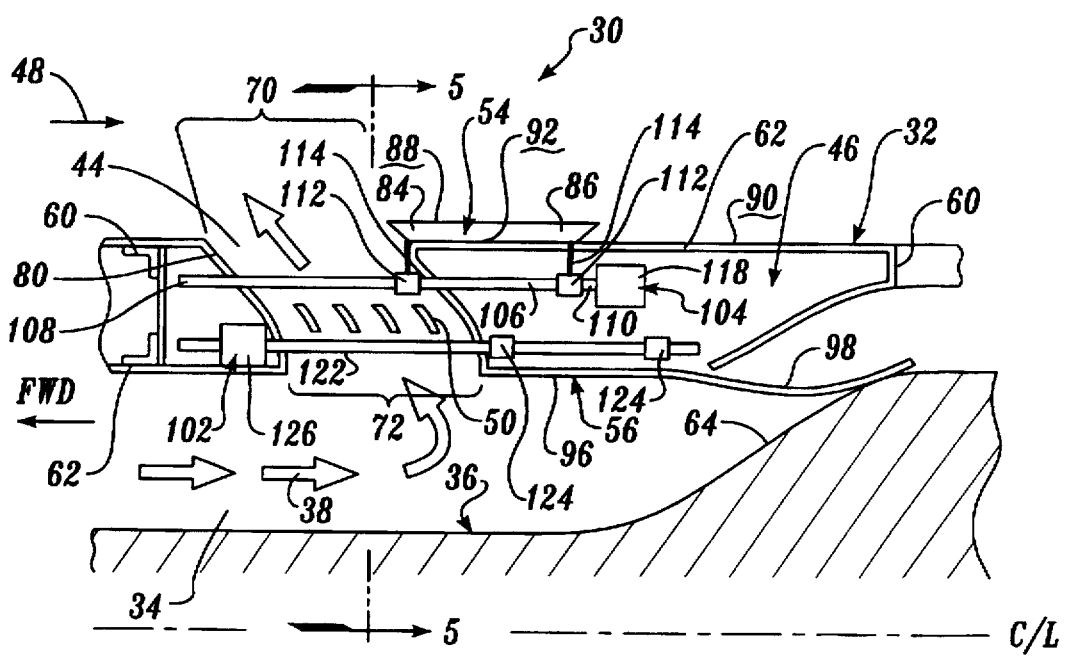
FIG. 4 is a side view of the thrust reverser system of FIG. 3 illustrating the system in an open, thrust-reversing state.

As noted above, the reverse thrust airflow duct 44 connects the exhaust duct 34 with the ambient atmosphere. As shown in FIGS. 4, when the thrust reverser system is in use, engine exhaust 38 enters the duct 44 at an inlet 72 located along the nozzle duct 34. Engine exhaust 38 exits the duct 44 at an external outlet 70 located outboard and slightly upstream of the internal inlet 72. Therefore, the duct 44 has a slight forward angular orientation. The angle 74 of the duct, in conjunction with the slats 50, directs the engine exhaust forward which reacts an opposite, reversing force on the nozzle that either slows the aircraft or causes the aircraft to move in reverse. The precise degree of airflow turn is determined by analyzing the force vectors required during reverse thrust. Preferred angles 74 are between about 30 to 60 degrees.

The general location of the duct 44 will depend on the gases being used to produce reverse thrust. If engine exhaust 38 is being used, the duct 44 should be located directly aft of the generator aft turbine. If a mixture of primary and bypass air is being used, the duct 44 should be located aft of the primary/bypass mixing plane. As is conventional with other airflow ducts, the present invention reverser thrust duct walls are formed of, or covered by, layers 80 of material that are heat and corrosion resistant. In circular or axisymmetric nozzles, the duct 44 extends circumferentially about the exhaust duct in the nozzle outer structure 46. In rectangular nozzles, the duct extends laterally between sidewalls. Optimally, a throat will be created in the duct 44 by controlling the duct width, the circumferential opening, and the solidity of the slats or louvers 50. The size and placement of the slats may also be used to define the characteristics of the throat, e.g., size, location, etc. Creating a throat causes the engine exhaust 38 to increase its velocity upon exiting the nozzle 32, thereby maximizing reverse thrust. The size of the reverse thrust duct 44 will also depend on the desired volume and speed of the gases to be expelled.

Figure 2:
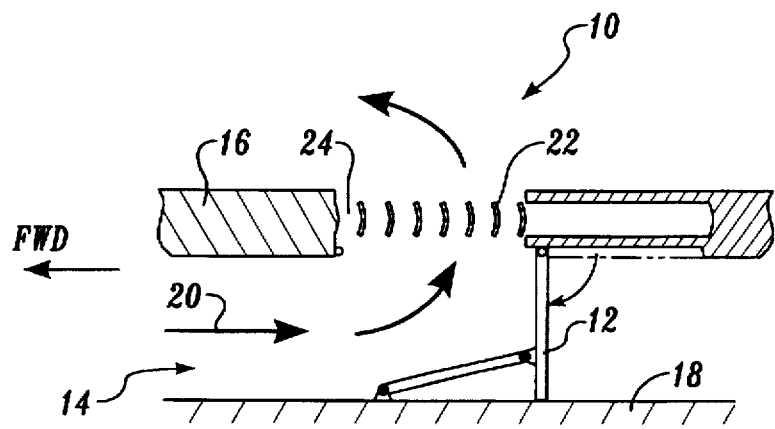
FIG. 2 is a side cross-sectional view of the thrust reverser system of FIG. 1 illustrating the system in an open, thrust-reversing state.
Figure 3:
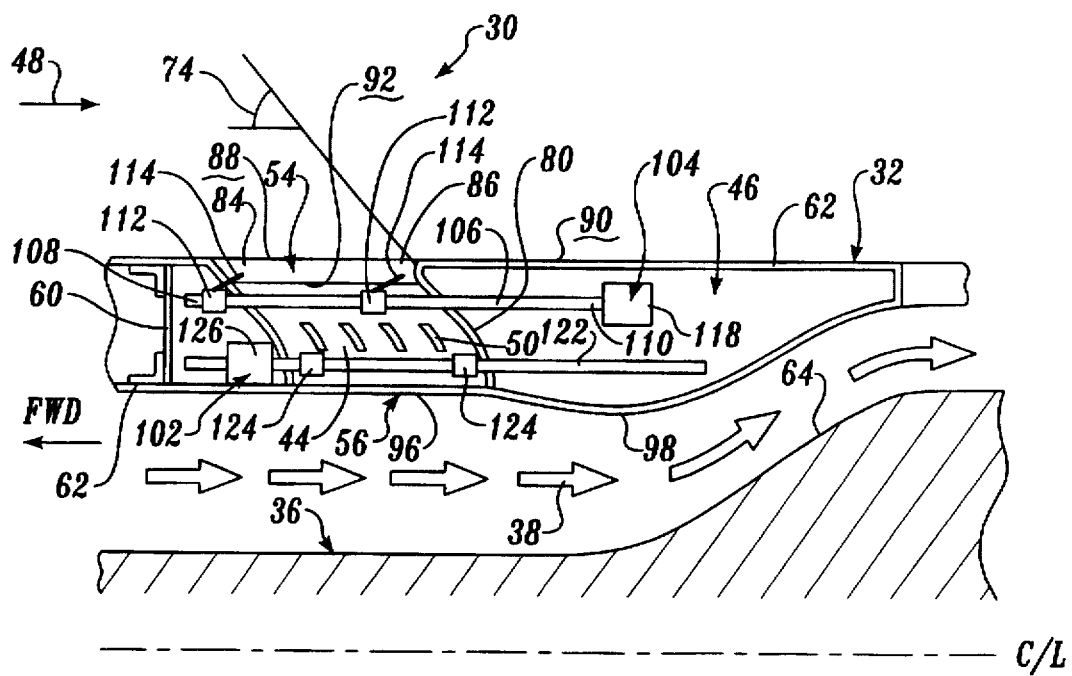
FIG. 3 is a side view of one embodiment of a thrust reverser system formed in accordance with the present invention in a closed state.
Figure 7:
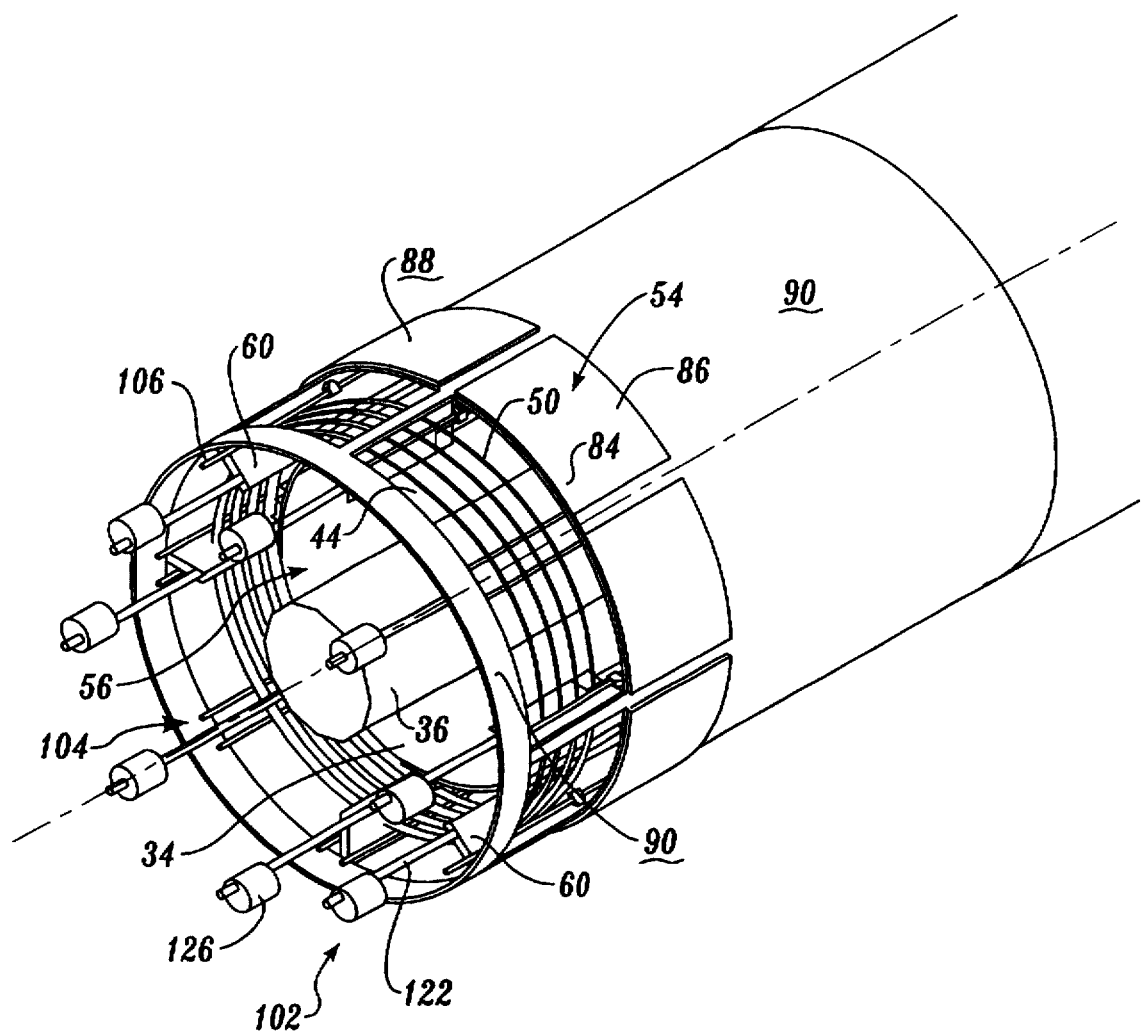
FIG. 7 is a perspective view of the thrust reverser system of FIG. 6 in an open, thrust-reversing state.

Referring to FIG. 7, located within the reverse thrust duct 44 are the cascades. The cascades are preferably similar to the cascades used in standard fan duct cascade thrust reverser systems 10 (see FIGS. 1 and 2), with the important exception that they be made to withstand the higher temperatures and pressures of the engine exhaust or mixed exhaust. Such cascades include a plurality of slats 50 (also sometimes called louvers or turning vanes). The slats 50, in combination with the duct 44, guide airflow in an outward and/or forward direction. The slats 50 preferably have an airfoil shape in order to encourage the airflow to turn. The slats 50 also preferably direct the reverser efflux in a circumferential pattern as to prevent hot gas from impinging on other aircraft structures and to prevent reingestion of the hot gases by an engine inlet. The slats 50 are attached to and between the numerous longitudinal supporting structures 60 available in the nozzle 32. Conventional attachment techniques include bolding, welding, riveting, etc. The number of cascades will vary significantly depending on the details of a particular application. As shown in FIGS. 3 and 4, the slats are centrally positioned within the reverse thrust duct 44. It is important for reasons explained below with regard to the inner and outer doors 56, 54, that the slats do not extend the entire outward distance of the duct 44.

Figure 6:
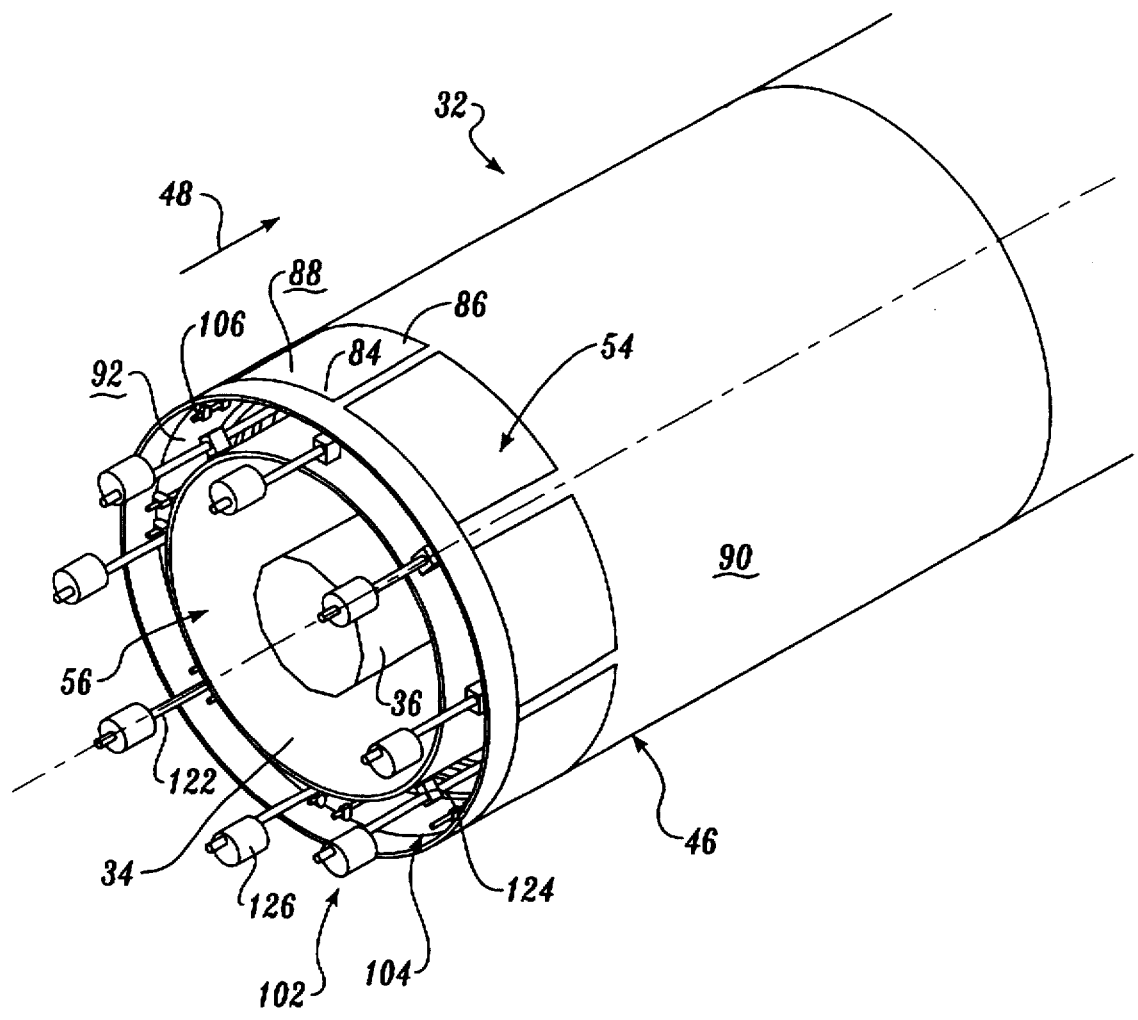
FIG. 6 is a perspective view of the thrust reverser system of FIG. 3 in a closed state.

Referring to FIGS. 6 and 7, the outer doors 54 are provided for closing the reverse thrust airflow duct 44 to the ambient atmosphere. Preferably, between about 8–16 outer doors are spaced evenly about the circumference of the engine. In a two-dimensional nozzle, a single outer door can be placed laterally between the sidewalls. The outer doors are roughly equal in size. Each outer door 54 includes an exterior surface 88, an inner surface 92, a forward end 84, and an aft end 86. The outer door 54 may be formed (cut, molded, pressed, etc.) from a solid piece of material (e.g., nickel-based super alloy, aluminum, ceramic, etc.) or may be built-up from various submembers, such as a composite or a sandwich-type structure.

The thickness of the outer door 54 will depend on the amount of space available in the duct 44 for housing the outer door 54 in its closed position, as well as the aerodynamic forces anticipated during use. In general, the outer door 54 should be strong enough to prohibit ambient air 48 from pushing past the outer door 54 and into the duct 44. The forward and aft outer door ends 84, 86 diverge in shape in the fore and aft directions, respectively, as shown in FIGS. 3 and 4 (as opposed to having vertical or tapered end surfaces). This divergence helps to seal the area between the ambient atmosphere and the enclosed duct of the outer structure 46.

In the closed position of FIG. 6, the outer door exterior surface 88 is flush with the surrounding nozzle outer structure exterior surfaces 90. This reduces the aerodynamic drag caused by the ambient flow 48 passing over the exterior of the nozzle. In the open position, the outer door 54 is moved away from the duct 44 to allow engine exhaust gas exiting the duct outlet 70 to merge with the ambient air 48. In one embodiment of the invention, the outer door 54, first moves outward into the ambient airflow 48 and then aft resulting in the outer door inner surface lying adjacent to the outer structure exterior surface 90. The actuation assembly moves the outer door 54 between its open and closed positions. Any one of a number of available actuation assemblies may be used. A preferred assembly is described below.

Figure 10:
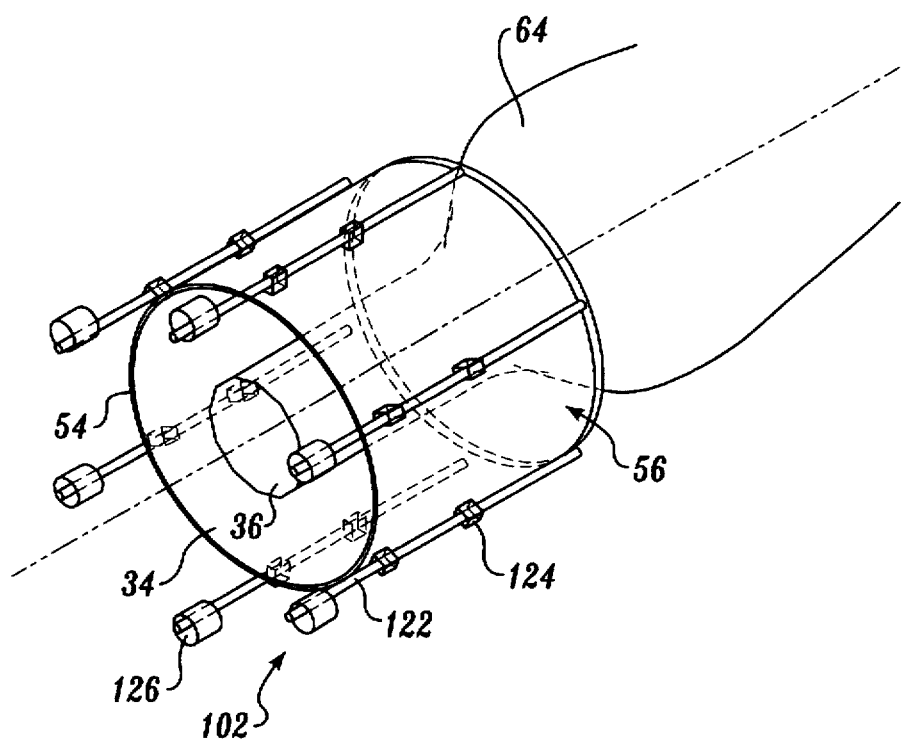
FIG. 10 is a perspective view of a first embodiment of an inner door formed in accordance with the present invention in a closed state.
Figure 11:
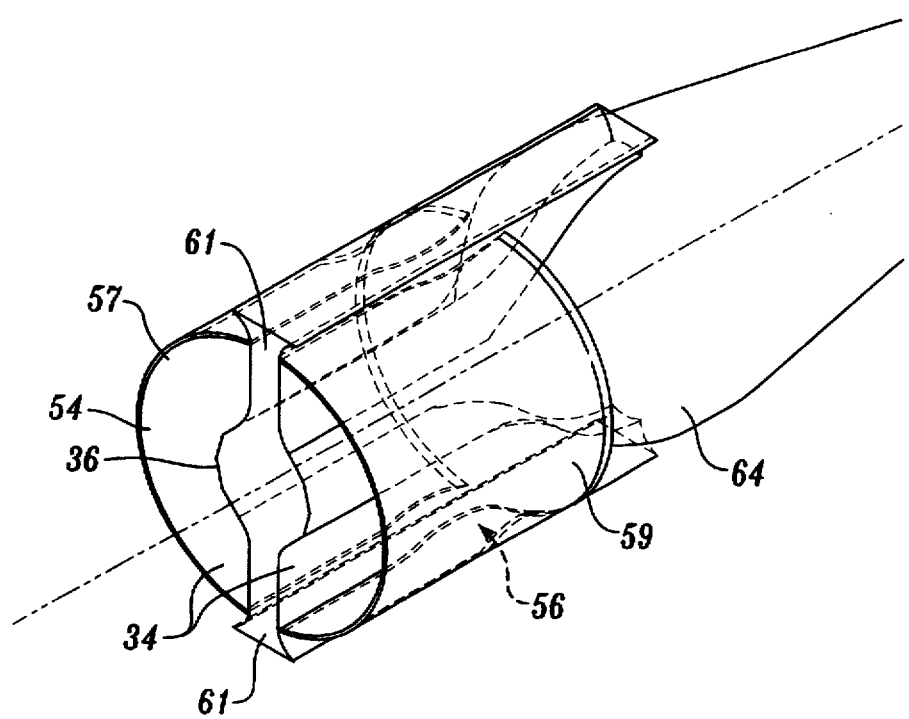
FIG. 11 is a perspective view of a second embodiment of an inner door formed in accordance with the present invention in a closed state.

The inner door 56 provides access to the reverse thrust airflow duct 44 and closes the exhaust duct 34. The shape of the inner door 56 corresponds generally to the shape of the duct inlet 72 requiring covering. For axisymmetric nozzle applications, the preferred embodiment of an inner door 56 is a unitary cylindrical annulus as shown in FIG. 10. This embodiment allows the inner door 56 to maintain hoop strength and to react duct pressure loads and flow blockage loads with the least amount of structure. The inner door 56 may be built-up from multiple pieces instead, though, it is not the most efficient method of formation, nor the strongest during use. Alternatively, shown in FIG. 11, the inner door is formed from two separate semicircular portions 57, 59. Radial extensions 61 of the centerbody are provided to add load carrying capability to the nozzle. These extensions may be used to attached the nozzle to a pylon. Such a split configuration may be useful for subsonic fan ducts in which bifurcation is being used to structurally support the engine core.

For two-dimensional nozzle applications, the present invention thrust reverser system is divided into both upper and lower system sections. Therefore, the preferred embodiment of an inner door 56 for two-dimensional nozzles is actually two linear doors, one being an upper inner door and the other being a lower inner door.

Figure 8:
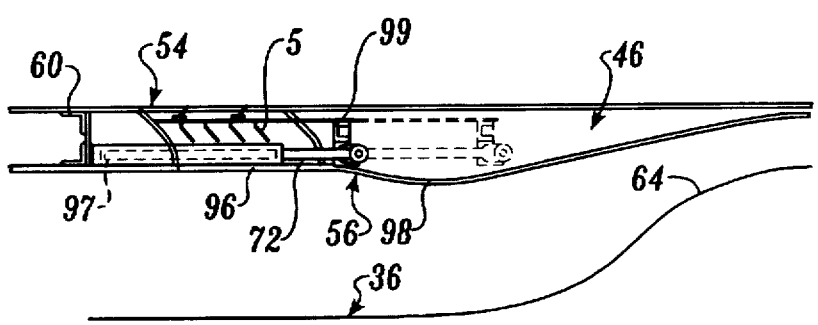
FIG. 8 is a side view of a third embodiment of a thrust reverser system formed in accordance with the present invention in a closed state.

The inner door 56 closes the exhaust duct 34 during the thrust reverse condition by translating a portion of the inner door 56 aftward to contact the centerbody 36, thereby blocking off the exhaust duct 34. As shown in the embodiment of FIGS. 3–4 and 8, the inner door 56 includes a forward portion 96 and an aft portion 98. Both the forward and aft portions 96, 98 form part of the nozzle exhaust duct walls. The forward portion 96 extends over the duct inlet 72. For this particular embodiment of the present invention, the forward portion 96 of the inner door is longitudinally linear in shape. Other shapes may be necessary, depending on the required contouring of the exhaust duct 34.

Figure 9A:
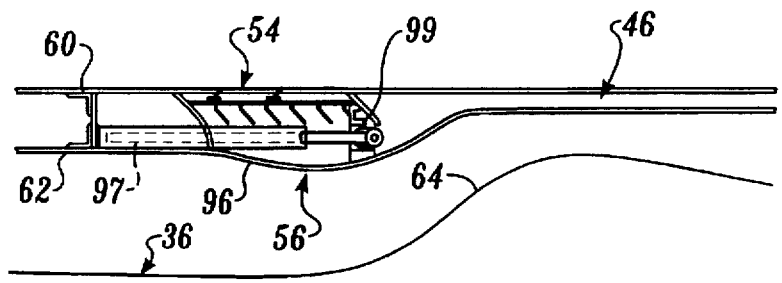
FIG. 9A is a side view of a third embodiment of a thrust reverser system formed in accordance with the present invention in a closed state.
Figure 9B:
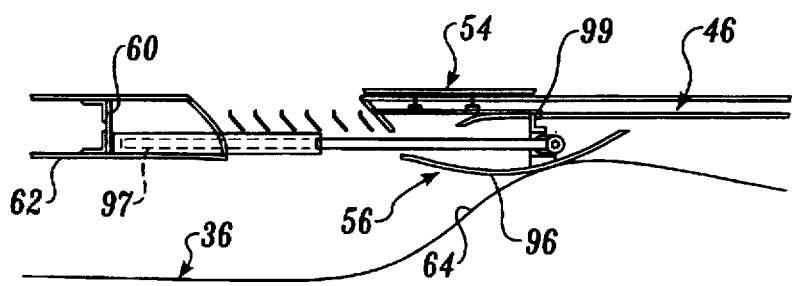
FIG. 9B is a side view of a third embodiment of a thrust reverser system formed in accordance with the present invention in an opened state.

For the embodiment show in FIGS. 3–4 and 8, the aft portion 98 is located in a region of the exhaust duct that has a slightly curved shape. Therefore, the aft portion 98 is slightly curved. As stated above, the aft portion 98 should be shaped such that as it translates aft, it will come in contact with the centerbody 36. Extending the inner door 56 a distance aft allows the inner door to be simply translated aftward during reverse thrust instead of requiring a lateral translation before a longitudinal translation. Alternatively, the inner door 56 may be formed like the outer door 54, where the inner door is first moved laterally out of the duct 44 and then translated longitudinally aftward. Depending on the contour of the exhaust duct and the dimensions of the ducts, the inner door may alternatively be comprised of only the forward portion 96, which is translated directly aft to come in contact with the centerbody 36. Such an arrangement is shown in FIGS. 9A and 9B.

As may be appreciated from viewing FIGS. 3–4 and 8–9B, the length of the inner door 56 will depend on the width of the duct 44 and the proximity of the inner door to the centerbody. Preferably, the distance between the inner door aftmost edge and the centerbody should be about the same size as the duct inlet width. If the distance is much greater, then an undesirable amount of extra time will be required to continue aft translation of the inner door 56 in order to block off the exhaust duct 34. During this extra time, exhaust gases 38 would undesirably continue flowing simultaneously through both the reverse thrust duct 44 and the exhaust duct 34. If the distance is much less, the duct 44 will not be fully open when the inner door 56 contacts the centerbody 36.

The fore and aft portions of the inner door are preferably formed by molding or bending the door into the required shape. The inner door 56 is formed from a sheet of molded or bent heat and corrosion resistant material, e.g., a nickel-based super alloys. The inner door 56 is preferably a unitary annular cylinder. Providing such an arrangement allows the inner door to not require substantial thickness, since the pressure loads between the exhaust duct 34 and the enclosed cavity of the reverse thrust duct in the outer structure 46 will be taken as hoop stress.

The inner door 56 is movable between closed and open positions. In the closed position, the inner door interior surface is flush with the surrounding exhaust duct walls. The inner door forward end forms a seal with the duct inner skin 62 located forward of the inner door. The actuation assembly moves the inner door 56 between its open and closed positions. As with the outer door 54, there are a number of actuation systems that can be used with the inner door 56. A preferred system is described next.

The actuation system for moving the inner and outer doors 56, 54 between their open and closed positions can be formed using any of a number of known techniques. One embodiment of an actuation system is illustrated in FIGS. 3–7 and includes inner and outer ball-screw assemblies 102, 104. A number of inner ball-screw assemblies 102 are connected to the inner door 56 at roughly evenly spaced distances. The inner and outer ball-screw assemblies 102, 104 are actuated in unison and are powered by rotation mechanisms 118, 126, e.g., rotary actuators, torque boxes, motors, etc.

Figure 5:
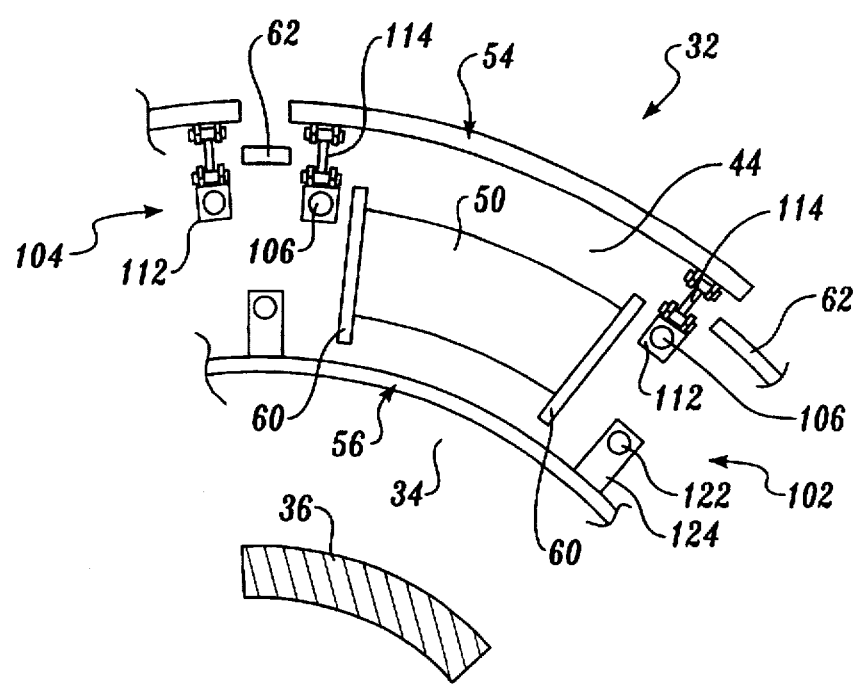
FIG. 5 is a cross-sectional view of second embodiment of a thrust reverser system formed in accordance with the present invention.

Shown in FIGS. 3 and 4, each outer ball-screw assembly 104 includes a threaded rod 106 having first and second ends 108, 110 located ahead of and behind the duct 44, respectively. Preferably, two outer ball-screw assemblies 104 are connected to each outer door near its sides as best illustrated in FIG. 5. Therefore the rod 106 extends longitudinally outside of the duct 44. Alternatively, as shown in FIGS. 3 and 4, the rod 106 may extend longitudinally through the reverse thrust duct 44 via appropriate opening modifications made to the reverse thrust duct walls. The best location will depend on the amount of space allowed for a specific design. Two or more carriages 112 are screwed onto the threaded rod 106. Each carriage 112 has a link 114 or bracket, rotatably connected to both the carriage 112 and the outer door 54. The rod 106, carriages 112, and links 114 are positioned inboard relative to the outer door. The links 114 are at a slight aft and outward angle to facilitate the outer door's initial outboard motion.

The rotation mechanism 118 is rotatably engaged with the threaded rod 106. When it is desired for the outer doors to open, the rotation mechanism 118 rotates the rod 106 in the direction that causes the carriages 112 to translate aft. As the carriages 112 begin to translate aft, the outer door 54 is first prevented from translating aft due to its set-in position in the duct outlet. The force applied to links 114 cause the outer door 54 to instead push outboard. Once the outer door 54 is free of the nozzle outer structure 46, the outer door 54 translate aft as the carriages 112 are moved, the links sliding through slots in the outer structure 46.

The inner ball-screw assembly 102 is similar to the outer assembly 104 and is likewise located according to the available space. As shown in FIGS. 3 and 4, inner assembly carriages 124 are connected directly to the inner door 56, since there is no need to translate the inner door 56 laterally before translating the inner door aft. The connection of the inner door 56 to the carriages 124 may be realized in any of a number of available ways. The rotation mechanism 126 of the inner door assembly 102 is attached to one end of the inner assembly threaded rod 122. As shown in FIGS. 3 and 4, the rotational mechanisms 118, 126 of the outer and inner assemblies 102, 104 may be located in front of or behind their respective threaded rods 106, 122. The precise placement will again depend upon available space.

An alternative actuation assembly is shown in FIGS. 8, 9A and 9B, where a single linear actuator 97 is used to translate inner and outer doors interconnected through a bridging member 99. There are a wide variety of arrangements that may be used in the present invention thrust reverser system. Regardless of the actuation assembly selected, it is preferable to control actuation through the use of a computer control system.

During forward thrust, the inner and outer doors 56, 54 cover the duct inlet 72 and outlet 70, respectively, to close off the reverse thrust duct 44. Therefore, exhaust gases 38 are prohibited from exiting the nozzle 32, and ambient air 48 is prohibited from entering the nozzle 32 through the reverse duct 44. Instead, ambient and exhaust airflows 48, 38 travel around and through the nozzle 32 without interruption.

During reverse thrust, the rotational mechanisms of the actuation system are activated to cause the ball-screw assemblies 102, 104 to simultaneously translate the inner and outer doors 56, 54 aftward, away from the duct 44. At the same time, the aft portion of the inner door 56 approaches the centerbody 36. Eventually, the inner door aft portion contacts the centerbody 36 and closes the exhaust duct 34. The exhaust gases 38 are blocked from continuing in the exhaust duct 34, and therefore are forced to exit the nozzle 32 through the reverse thrust duct 44. The gases are thrust with outward and forward directional components. This reaction force is transmitted to the aircraft through the components attaching the nozzle 32 to the aircraft body or wing. The reverse thrust duct 44 acts as a throat to improve the efficiency of the reverse efflux and prevent hot gas from impinging on the aircraft structure.

While the preferred embodiment of the invention has been illustrated and described, it will be appreciated that various changes can be made therein without departing from the spirit and scope of the invention. In particular, various seals may be utilized at the inner and outer door 56, 54 locations. In addition, the above described actuation system is one of a number of known techniques that may be used to translate the inner and outer doors 56, 54 aftward.

The embodiments of the invention in which an exclusive property or privilege is claimed are defined as follows:

1. In an aircraft thrust reverser system including a stationary outer structure surrounding an exhaust duct having a centerbody, the outer structure having fixed support structures including a number of longitudinal support struts, the outer structure further including a number of reverse thrust airflow ducts containing cascades located circumferentially between the longitudinal support struts, the reverser thrust airflow ducts for connecting the exhaust duct with the ambient atmosphere, the improvement comprising:
   (a) a plurality of outer doors for closing the reverse thrust airflow ducts which contain the cascades to the atmosphere, each outer door having open and closed positions, the outer door open and closed positions being oriented parallel to one another;
   (b) a single cylindrical inner door for closing the reverse thrust airflow ducts at the exhaust duct, the inner door having open and closed positions, the inner door including an inboard surface; in the open position the inboard surface contacting the centerbody to block airflow through the exhaust duct; and
   (c) an actuation system for moving the inner and outer doors between their open and closed positions; the actuation system comprising:
      (i) first actuators connected between the fixed support structures and the outer doors, the first actuators being oriented in a longitudinal direction; and
      (ii) second actuators connected between the fixed support structures and the inner door, the second actuators being oriented in a longitudinal direction; the first and second actuators being arranged to cause the inner and outer doors to translate linearly fore and aft without rotation in going between their open and closed positions.

2. The thrust reverser system according to claim 1, wherein the first and second actuators each include a linear actuator.

3. The thrust reverser system according to claim 1, wherein the first and second actuators each include a ball-screw assembly comprising a longitudinally-oriented threaded rod to which a carriage is threaded upon, the carriage being connected to the respective door, and a rotation mechanism for causing rotational motion of the threaded rod.

4. The thrust reverser system according to claim 3, wherein the carriages are pivotably connected to the outer doors, wherein in the closed position the outer door is flush with the exterior of the outer structure, and in the open position the outer door is adjacent the exterior of the outer structure, the pivotable connections of carriages to the outer doors allowing the transition between the closed and open positions.

5. The thrust reverser system according to claim 1, wherein the inner door is a unitary cylindrical annulus.

6. The thrust reverser system according to claim 1, wherein the inner door is a multi-piece cylindrical annulus.

7. In an aircraft thrust reverser system including a stationary outer structure surrounding an exhaust duct having a centerbody, the outer structure having fixed support structures including a number of longitudinal support struts, the outer structure further including a number of reverse thrust airflow ducts containing cascades located circumferentially between the longitudinal support struts, the reverser thrust airflow ducts for connecting the exhaust duct with the ambient atmosphere, the improvement comprising:
   (a) a number of outer doors for closing the reverse thrust airflow ducts which contain the cascades to the atmosphere, each outer door having open and closed positions;
   (b) a single cylindrical inner door for closing the reverse thrust airflow ducts at the exhaust duct, the inner door having open and closed positions, the inner door including an inboard surface; in the open position the inboard surface contacting the centerbody to block airflow through the exhaust duct;
   (c) a bridging member interconnected between the inner door and the outer doors, movement of inner door causing simultaneous like movement of the outer door; and
   (d) an actuation system for moving the inner and outer doors between their open and closed positions; the actuation system comprising a number of actuators connected between the fixed support structures and the inner door, the actuators being oriented in a longitudinal direction; wherein the inner door and outer doors are translated by the actuators linearly fore and aft without rotation in going between their open and closed positions.

8. The thrust reverser system according to claim 7, wherein the inner door is a unitary cylindrical annulus.

9. The thrust reverser system according to claim 7, wherein the inner door is a multi-piece cylindrical annulus.

10. The thrust reverser system according to claim 7, wherein the exhaust duct is a primary exhaust duct, the centerbody is a primary nozzle plug assembly, and the at least one actuator includes multiple linear actuators attached to fixed support structure at a location forward of the reverse thrust airflow ducts.

11. The thrust reverser system according to claim 10, wherein the inner door comprises a portion that covers the inlet when the inner door is closed, the inboard surface of the same portion contacting the centerbody when the inner door is open to block the exhaust duct.

12. In an aircraft thrust reverser system including a stationary outer structure surrounding an exhaust duct having a centerbody, the outer structure having fixed support structures including a number of longitudinal support struts, the outer structure further including a number of reverse thrust airflow ducts containing cascades located circumferentially between the longitudinal support struts, the reverser thrust airflow ducts for connecting the exhaust duct with the ambient atmosphere, the improvement comprising:
   (a) outer doors for closing the reverse thrust airflow ducts which contain the cascades to the atmosphere, each outer door having open and closed positions;
   (b) first and second separate semicircular inner doors for closing the reverse thrust airflow ducts at the exhaust duct, the inner doors having open and closed positions, the inner doors including an inboard surface; in the open position the inboard surfaces contacting the centerbody to block airflow through the exhaust duct; and (c) an actuation system for moving the inner and outer doors between their open and closed positions; the actuation system comprising at least two actuators interconnected between the fixed support structures and the inner and outer doors, the actuators being oriented in a longitudinal direction; wherein the inner door and outer doors are translated by the actuators linearly fore and aft without rotation in going between their open and closed positions.

13. The thrust reverser system according to claim 12, wherein the actuation system comprising at least one first actuator interconnected between the fixed support structures and the outer doors; at least one second actuator interconnected between the fixed support structures and the first inner door; and at least one third actuator interconnected between the fixed support structures and the second inner door.

14. The thrust reverser system according to claim 12, wherein the actuators are linear actuators.

15. The thrust reverser system according to claim 12, wherein the actuators are ball-screw assemblies comprising a longitudinally-oriented threaded rod to which a carriage is threaded upon, the carriage being connected to the respective door, and a rotation mechanism for causing rotational motion of the threaded rod.

16. The thrust reverser system according to claim 15, wherein the carriages are pivotably connected to the outer doors, wherein in the closed position the outer door is flush with the exterior of the outer structure, and in the open position the outer door is adjacent the exterior of the outer structure, the pivotable connections of carriages to the outer doors allowing the transition between the closed and open positions.

17. The thrust reverser system according to claim 12, wherein the inner door is a unitary cylindrical annulus.

\* \* \* \* \*